United States Patent [19]
Haven et al.

[11] Patent Number: 4,744,636
[45] Date of Patent: May 17, 1988

[54] ELECTRON BEAM-ADDRESSED LIQUID CRYSTAL CELL HAVING COATING LAYER FOR SECONDARY ELECTRON EMISSION

[75] Inventors: Duane A. Haven, Milwaukie; Thomas S. Buzak, Beaverton; Rolf S. Vatne, Portland, all of Oreg.

[73] Assignee: Tektronix, Inc., Beaverton, Oreg.

[21] Appl. No.: 46,807

[22] Filed: May 5, 1987

[51] Int. Cl.4 ............................................. G02F 1/13
[52] U.S. Cl. ........................... 350/331 R; 350/339 R; 313/399; 358/236
[58] Field of Search ................. 350/331 R, 337, 345, 350/339 R; 313/398, 465, 399; 358/236, 234, 60

[56] References Cited

U.S. PATENT DOCUMENTS

| | | | |
|---|---|---|---|
| 3,825,791 | 7/1974 | Kazan | 313/398 |
| 3,875,447 | 4/1975 | Kazan | 313/465 |
| 3,902,096 | 8/1975 | Todd, Jr. | 313/398 |
| 4,131,821 | 12/1978 | Mossman | 313/398 |

OTHER PUBLICATIONS

D. A. Haven, "Electron-Beam Addressed Liquid Crystal Light Valve", IEEE Transaction on Electronic Devices, vol. ED-30, No. 5, May 1983.

I. E. Chang, "Electron Beam Addressable Liquid Crystal Display with Storage Capability", IBM Technical Disclosure Bulletin, vol. 16, No. 1, Jun. 1973.

*Primary Examiner*—Stanley D. Miller
*Assistant Examiner*—Huy V. Mai
*Attorney, Agent, or Firm*—John D. Winkelman; Paul S. Angello

[57] ABSTRACT

An electron beam-addressed liquid crystal cell for a light valve. The cell (40) includes liquid crystal material (42) sandwiched between two substrates (16, 44). One substrate (44) is addressed by the electron beam (60a, 60b) and includes a coating (51) having a rate of secondary electron emission greater than the characteristic rate of secondary electron emissions of the base layer (49) of the substrate (44). The enhanced secondary electron emission characteristics of the coated substrate (44) permit the cell to be modulated with relatively lower electron beam current for correspondingly higher image resolution.

5 Claims, 2 Drawing Sheets

ELECTRON BEAM-ADDRESSED LIQUID CRYSTAL CELL HAVING COATING LAYER FOR SECONDARY ELECTRON EMISSION

TECHNICAL FIELD

The present invention relates to electron beam-addressed liquid crystal light valves and, in particular, to a liquid crystal cell used in such valves.

BACKGROUND INFORMATION

One type of liquid crystal light valve is a projection-type image display apparatus. The light valve comprises an evacuated ceramic envelope that incorporates a pair of opposing transparent windows as part of the envelope wall. One window forms part of a liquid crystal cell. The remainder of the cell is assembled adjacent to the inner surface of that window. Polarized light is typically directed through the envelope windows. The light exiting the liquid crystal cell passes through a polarizing filter or analyzer. Any light passing through the analyzer is transmitted via a projection lens system onto a suitable viewing surface.

The liquid crystal cell includes liquid crystal material captured between two substrates. One substrate is formed of glass and is incorporated into the wall of the envelope to serve as a window as mentioned above. The opposing substrate comprises a thin dielectric material. The cell is preferably of the twisted nematic type, which is constructed so that in the absence of an applied electric field (i.e., with the cell in the "OFF" state) the cell rotates by 90° the polarization direction of the projected light. With the cell in the "OFF" state, no light passes through the analyzer and the viewing surface remains dark. When an electric field is applied to the cell (i.e., when the cell is switched to the "ON" state) the projected light passes through the cell with the polarization direction unchanged. As a result, the light passes through the polarizing analyzer to the viewing surface.

An electron beam-addressed liquid crystal light valve employs an electron beam for modulating the polarization direction of light passing through the liquid crystal cell. Specifically, an electron gun is mounted within the light valve envelope and provides a beam of electrons that strike the side of the liquid crystal cell carrying the thin dielectric substrate, which is called the target substrate. The electron beam direction is deflected by suitable circuitry to raster scan the target substrate. A collector electrode is mounted within the liquid crystal light valve near the target substrate. To produce or "write" an image, the electron beam and collector electrode positioned above and over the target substrate cooperate to develop an electrostatic potential at certain points on the surface of the target substrate that correspond to the desired image. As a result, those points on the liquid crystal cell are switched to the "ON" state, thereby permitting associated portions of the projected light of unchanged polarization direction to pass through the valve and form the image on the viewing surface.

As noted, the target substrate for an electron beam-addressed liquid crystal light valve preferably comprises thin dielectric material. The target substrate must be thin to minimize spreading of the electric field lines produced by the charge deposited on the surface. Spreading of the field lines reduces the resolution of the projected image. A film of five to ten microns in thickness forms a suitable target substrate.

Copending U.S. patent application of Buzak et al., Ser. No. 046,822, entitled Liquid Crystal Light Valve with Electrically Switchable Secondary Electron Collector Electrode, filed concurrently herewith, describes a particular configuration and optimal operation mode for an electron beam-addressed liquid crystal light valve. More particularly, that application describes write and erase modes wherein the collector electrode is configured and arranged to create strong collecting fields to control the redistribution of secondary electrons generated by the electron gun. When in the write mode, the collector electrode is maintained at positive voltage relative to the target substrate as the electron beam bombards the target substrate with electrons of sufficient energy to result in secondary electron emissions from the target substrate surface. The secondary electrons are collected on the positively charged collector electrode. The rate of secondary electron emission is greater than the rate the incident electrons are delivered by the electron gun. Consequently, the beam-addressed area of the target substrate surface is driven positive. This change in potential switches the corresponding region of the liquid crystal cell to the "ON" state To erase the image (i.e., to switch the previously written region of the liquid crystal cell to the "OFF" state), the collector electrode is switched to a negative potential relative to the written region of the target substrate. An electron beam, either emanating from the same gun as used for writing or from a separate gun, is scanned over the target substrate. The resulting secondary electrons, repelled by the negatively charged collector electrode, are directed to the previously written (positively charged) regions. Accordingly, the positive potential difference at the previously written areas of the target substrate is removed and the corresponding region of the liquid crystal cell is switched to the "OFF" state.

The above-noted copending U.S. patent application presents an operating mode for an electron beam-addressed liquid crystal light valve wherein both a writing electron gun and an erasing electron gun are operated to produce electron beams with energy suitable for generating secondary electrons at a rate greater than the rate the incident electrons are delivered by the beams (the latter rate being the beam current). The ratio of secondary electron emissions to incident electrons is known as the secondary electron emission ratio. Accordingly, for the operating modes just described, the writing and erasing guns are controlled so that the secondary electron emission ratio is always greater than one.

For any given beam energy, the rate of secondary electron emissions from the substrate varies depending upon the material used as the target substrate. Further, it is desirable to bombard the substrate with relatively low incident beam current to minimize the beam spot size and produce a correspondingly higher resolution image.

SUMMARY OF THE INVENTION

This invention is directed to a liquid crystal cell with enhanced secondary electron emission characteristics that permit operation of an electron beam-addressed liquid crystal light valve with beam current low enough to create a high resolution image. The liquid crystal cell formed in accordance with this invention particularly comprises a first transparent substrate and a second transparent substrate positioned adjacent thereto. Liquid crystal material is sandwiched between the two substrates and in response to an applied electric field modulates incident light electrooptically as the electron beam strikes the liquid crystal cell. The second substrate has a base layer formed of material that emits secondary electrons at a first rate of emission when struck by an electron beam propagating with a predetermined energy. A coating is applied to one surface of the base layer of the second substrate. The coating is formed of material that emits secondary electrons at a second rate of emission when struck by the electron beam propagating with the predetermined energy. The second rate of emission of the coating is greater than the first rate of emission of the base layer. Consequently, compared to an uncoated second substrate, the coated substrate produces a greater secondary electron emission ratio, which permits lower beam current and consequent higher image resolution.

As another aspect of this invention, the coating applied to the base layer provides a secondary emission ratio that remains stable for a longer time compared to an uncoated target substrate.

As another aspect of this invention, the light transmission characteristics of the coated substrate are enhanced with an application of anti-reflection material.

DETAILED DESCRIPTION OF A PREFERRED EMBODIMENT

Figure 1:
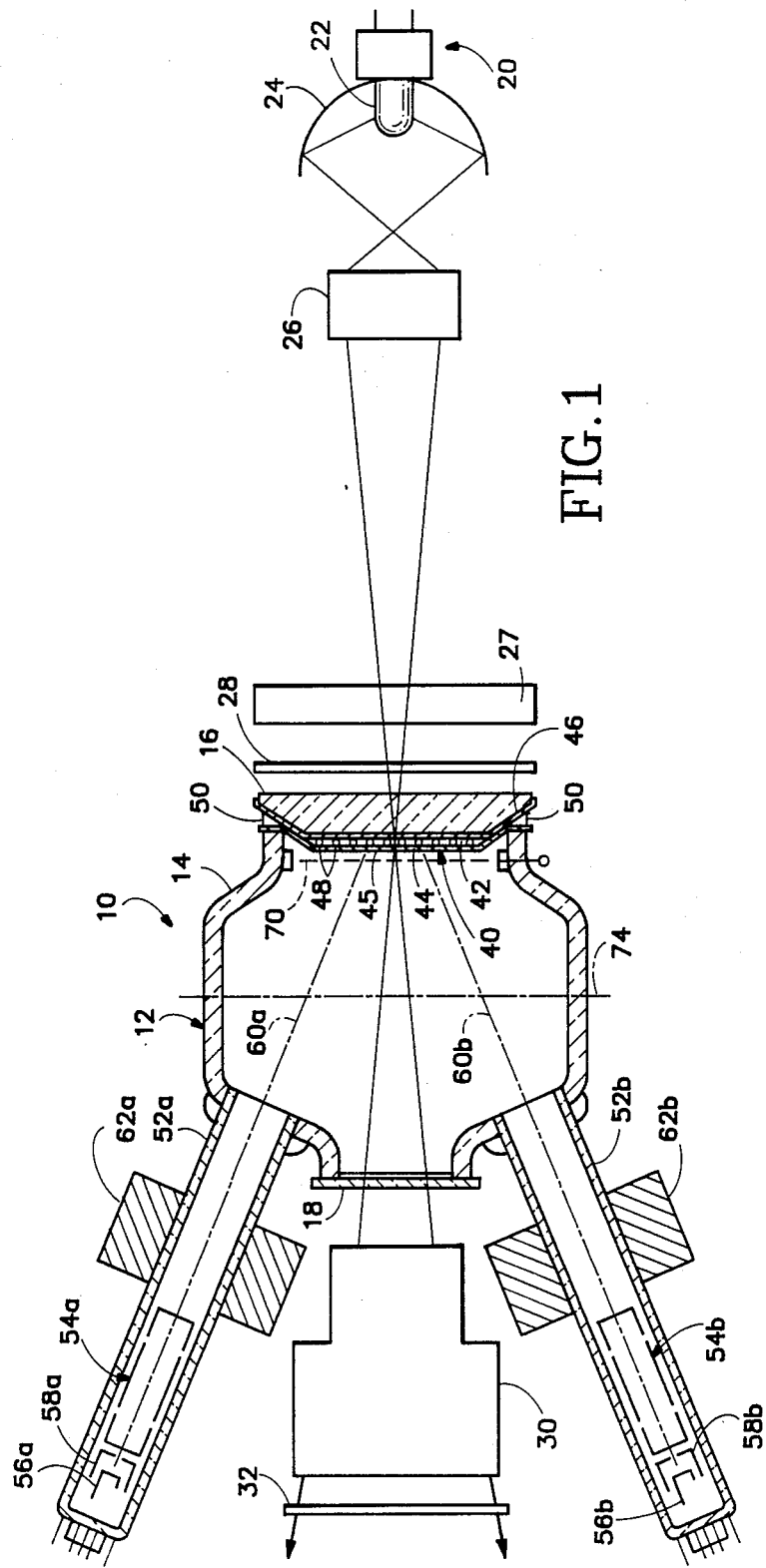
FIG. 1 is a diagram of an electron beam-addressed liquid crystal light valve including a liquid crystal cell formed in accordance with this invention.

FIG. 1 depicts an electron beam-addressed liquid crystal light valve 10 including a liquid crystal cell formed in accordance with this invention. The light valve comprises an evacuated envelope 12 that includes a ceramic body 14 with an optically transparent entry window or faceplate 16 and an optically transparent exit window 18 mounted thereto.

Light from a suitable source 20, such as a projection lamp 22 and a parabolic reflector 24, is directed by an input lens system 26 and a field lens system 27 through a neutral density linear polarizing filter 28 into faceplate 16. Input lens system 26 reformats the size of the area illuminated by light source 20, and field lens system 27 steers the light in the proper direction to propagate through window 18. The light exiting window 18 is projected by a projection lens system 30 through a neutral density linear polarizing filter or analyzer 32 and toward a remote viewing surface (not shown). Polarizing filter 28 and analyzer 32 are arranged so that their light transmitting axes are parallel to each other. Skilled persons will appreciate that light valve 10 can be configured to operate with orthogonally aligned light transmitting axes of polarizing filter 28 and analyzer 32.

Glass faceplate 16 of light valve 10 forms part of an internal liquid crystal cell 40 (enlarged in FIG. 1 for clarity) which is disposed in the path of the polarized projection light entering envelope 12 through faceplate 16. Specifically, cell 40 comprises a layer 42 of a nematic liquid crystal material captured between two substrates, the faceplate 16 and a thin optically transparent dielectric target substrate 44. The faceplate 16 and target substrate are held apart by spacers 48 such as glass spheres having a diameter of about six to eight microns, or photolithographically fabricated elements arranged in a fixed array on the surface of the target substrate 44. The faceplate 16 and substrate 44 are sealed to the body 14 with ceramic frit seals 50 or other suitable material. Preferably, the cell is assembled with the target substrate stretched over the spacers 48 in the manner described in copending U.S. patent application of Chitwood et al., Ser. No. 046,826, entitled Liquid Crystal Cell and Method of Assembly of Same, filed concurrently heerwith. The resulting tension stresses in the target substrate secure the substrate in place so that the cell will maintain a uniform thickness.

An optically transparent conductive film 46 of indium tin oxide (ITO) covering the inner surface of envelope faceplate 16 serves as a backplate electrode for the cell. A DC voltage is applied to condutive film 46 to make it greatly more positive than the voltage of the cathode of the writing electron gun, which is described below.

The interior surface of target substrate 44 and the ITO film 46 are treated to provide a homogeneous (i.e., parallel) surface alignment of the nematic material. The alignment directions of the two surfaces are perpendicular and provide a 90° twist cell. The desired surface treatment is provided in a known manner, such as by vacuum-depositing silicon monoxide (SiO) onto the surface at an angle of about 5° relative to the plane of the surface.

One type of nematic liquid crystal material suitable for use in cell 40 is commercially available from E. Merck as ZLI 2244.

The molecules of the nematic liquid crystal material in layer 42 are ordered such that polarization direction of plane polarized light passing through the cell is rotated 90° in the absence of an applied electric field (i.e., with the cell in the "OFF" state). Whenever a potential difference is applied across any region of the liquid crystal material, the longitudinal axes of the liquid crystal molecules in that region tend to align in a direction parallel to the resulting field, thereby decreasing the amount of rotation of the polarization direction of the light passing through that region of the cell 40. If the potential difference across cell 40 is of sufficient magnitude (i.e., the cell in the "ON" state), the polarization direction of the light passing through that region of the cell remains substantially unchanged. Since the light-transmitting axes of both polarizing filter 28 and analyzer 32 are parallel, light passes through regions of the cell 40 that are in the "ON" state. Passage of light is blocked by regions of the cell that are in the "OFF" state.

Envelope 12 further comprises first and second similar elongate tubular glass necks 52a and 52b, one end of each neck being frit sealed to body 14 adjacent window 18. A writing electron emitting means or gun 54a is mounted within neck 52a. Gun 54a includes a cathode 56a, a control grid 58a, and associated electrodes for forming a narrow electron beam 60a directed at an oblique angle relative to and toward liquid crystal cell 40. Conductive film 46 is held at a very large positive potential relative to the potential applied to cathode 56a of gun 54a and, therefore, contributes to the acceleration potential of writing beam 60a. Video or other input signals are applied to grid 58a to modulate the beam current of electron beam 60a in accordance with the video image to be projected onto the remote viewing surface.

Modulated writing beam 60a is raster scanned across the surface of target substrate 44 by suitable electrical signals supplied by deflection circuitry (not shown) to an electromagnetic deflection yoke 62a supported on neck 52a. Light valve 10 could alternatively be constructed with an electrostatic deflection structure. Writing gun 54a is operated so that the electrons in beam 60a strike the target substrate 44 with an energy adequate to create secondary electron emissions from the surface of the target substrate 44 at a rate that exceeds the rate the incident electrons are delivered to the target substrate by the writing gun 54a. That is, the resulting secondary electron emission ratio is greater than 1.

A secondary electron collector electrode 70, preferably of the grid type or mesh type is mounted within the envelope 12 in substantially parallel, opposed relation to the target substrate 44 between the substrate 44 and the electron guns 54a, 54b. Writing beam 60a is directed through electrode 70 and toward target substrate 44. The electrode 70 is positively charged relative to the target substrate when the writing gun 54a is operated.

Whenever writing beam 60a is raster scanned over target substrate, a collector electrode controller circuit (not shown) applies a potential of about +300 volts to electrode 70, which collects the emitted secondary electrons. Consequently, the region of the target substrate 44 struck by the writing beam 60a has a positive electrostatic potential. This change in potential switches the corresponding region of the liquid crystal cell to the "ON" state.

An erasing electron gun 54b is mounted within neck 52b. Gun 54b includes a cathode 56b, a control grid 58b, and associated electrodes for forming a narrow electron beam 60b that is directed at an oblique angle relative to and toward target substrate 44 of liquid crystal cell 40. After a complete raster scan of the surface of target substrate 44 by writing beam 60a, erasing beam 60b is raster scanned across the surface of target substrate 44 by suitable electrical signals supplied by deflection circuitry (not shown) to an electromagnetic deflection yoke 62b supported on neck 52b. It is noted that light valve 10 could alternatively be constructed with an electrostatic deflection structure.

Erasing gun 54b is operated in a manner similar to that of writing gun 54b in that the electrons in beam 60b strike the surface of target substrate 44 with an energy adequate to create a secondary electron emissions ratio greater than 1.

Whenever erasing beam 60b is raster scanned across the surface of target substrate 44, the electrode 70 is held at a zero volts potential relative to the potential on conductive film 46. Such a potential on electrode 70 causes the secondary electrons to redeposit primarily on the surface of target substrate 44, and thereby erase the image which had previously been written by writing beam 60a. The image can, of course, be maintained by rewriting it at a suitable refresh rate. In a 60 Hz noninterlaced display monitor for computers, for example, each field would be scanned by the writing beam every 16 ⅔ milliseconds, but information would be written in alternate fields. The display would be erased in the field during which no writing takes place. Therefore, the information refresh rate would be 33.33 milliseconds.

As mentioned earlier, both the writing electron gun 54a and the erasing electron gun 54b are operated so that the resulting incident electron energy is suitable to create a secondary electron emission ratio of a value greater than 1. As also noted earlier, it is desirable to drive the beam with the lowest current necessary to achieve a secondary electron emission ratio of a value greater than 1 so that a relatively high resolution image is produced. The liquid crystal cell of the present invention includes a dielectric target substrate that is treated to produce an overall higher secondary electron emission ratio for a given incident beam energy than is possible using target substrates not so treated. Consequently, the magnitude of beam current can be correspondingly reduced, thereby reducing the beam spot size to increase the resolution of the image.

Figure 2:
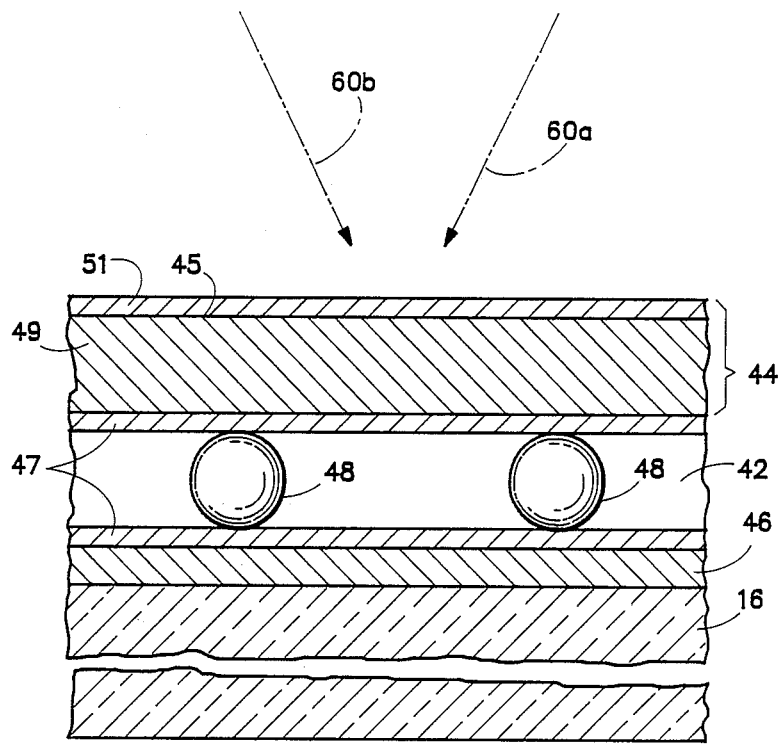
FIG. 2 is an enlarged view of a section of a liquid crystal cell formed in accordance with this invention.

Specifically, with reference to FIG. 2, the liquid crystal cell of the present invention includes the liquid crystal material 42 sandwiched between the rigid glass faceplate 16, and a flexible dielectric target substrate 44 described more fully below. As described earlier, the conductive ITO film 46 is deposited on the inner surface of the faceplate 16. The silicon monoxide alignment layers 47 cover the interior surfaces of the target substrate 44 and the ITO film 46. Glass spheres 48 or, alternatively, photolithographically fabricated elements, are positioned to maintain space between the target substrate 44 and the glass faceplate 16.

In accordance with this invention the target substrate 44 comprises about a five to seven micron thick base layer 49 of mica having a coating 51 applied to the outer surface 45. Although mica is preferred for the base layer, other dielectric materials such as polyimide and polyester films are suitable. The coating 51 is comprised of material having, for the incident electron beam energy, a characteristic secondary electron emission ratio generally higher than that of the base layer 49 absent the coating 51. Preferably, the coating 51 is a 300 angstrom layer of magnesium oxide (MgO).

It can be appreciated that the relatively high secondary electron emission ratio of the coating permits the electron beam-addressed liquid crystal light valve to be operated with correspondingly lower beam current (i.e., lower rate of incident electrons delivered) while still achieving a ratio greater than 1, thereby producing a relatively higher resolution image.

The MgO coating exhibits a more stable secondary emission ratio as compared to uncoated mica. That is, the coated target substrate of the invention will, over time, show little variation in the secondary emission ratio compared to an uncoated substrate.

In order to maintain high light transmission properties of the overall liquid crystal cell, the coating 51 may be used in conjunction with a dielectric anti-reflection compound such as magnesium fluoride. The magnesium fluoride is applied as a thin film in accordance with conventional techniques for depositing multilayer coatings. Of course, other dielectric compounds with comparable anti-reflection properties may also be used.

While the present invention has been described in relation to a preferred embodiment, it is to be understood that various alterations, substitutions of equivalents and other changes can be made without departing from the underlying principles of the invention. For example, certain types of liquid crystal cells do not require polarized light to modulate incident light electrooptically. As another example, the liquid crystal light valve can be operated in more than two states to provide images of different gray scale intensities. The scope of the invention is defined, therefore, in the appended claims.

We claim:

1. An electron beam-addressed liquid crystal cell for a light valve, comprising:
   (a) a first transparent substrate;
   (b) a second transparent substrate positioned adjacent to the first substrate and having a base layer with an outer surface, the base layer being formed of material that emits secondary electrons at a first rate of emission when struck by an electron beam propagating with a predetermined energy;
   (c) a coating applied to the outer surface of the base layer of the second substrate, the coating being formed of material that emits secondary electrons at a second rate of emission when struck by the electron beam propagating with the predetermined energy, the second rate of emission being greater than the first rate of emission; and
   (d) liquid crystal means sandwiched between the first and second substrates for modulating incident light electrooptically as the liquid crystal cell is struck by the electron beam.

2. The cell of claim 1 wherein the coating is magnesium oxide.

3. The cell of claim 2 wherein the coating is covered with a thin film of magnesium fluoride.

4. The cell of claim 1 further including conductor means positioned within the light valve to extend across the path of the electron beam for selectively attracting secondary electrons emitted from the second substrate.

5. A target substrate for a liquid crystal cell that is addressed by an eletron beam having a predetermined energy, comprising:
   (a) a base layer formed of material that emits secondary electrons at a first rate of emission when addressed by the beam; and
   (b) a coating applied to the base, the coating being formed of material that emits secondary electrons at a second rate of emission when addressed by the beam, the second rate of emission being greater than the first rate of emission.

* * * * *